Jan. 3, 1928.
J. A. STEVENS
SHOCK ABSORBER
Filed Sept. 9, 1926
1,655,205
2 Sheets-Sheet 2
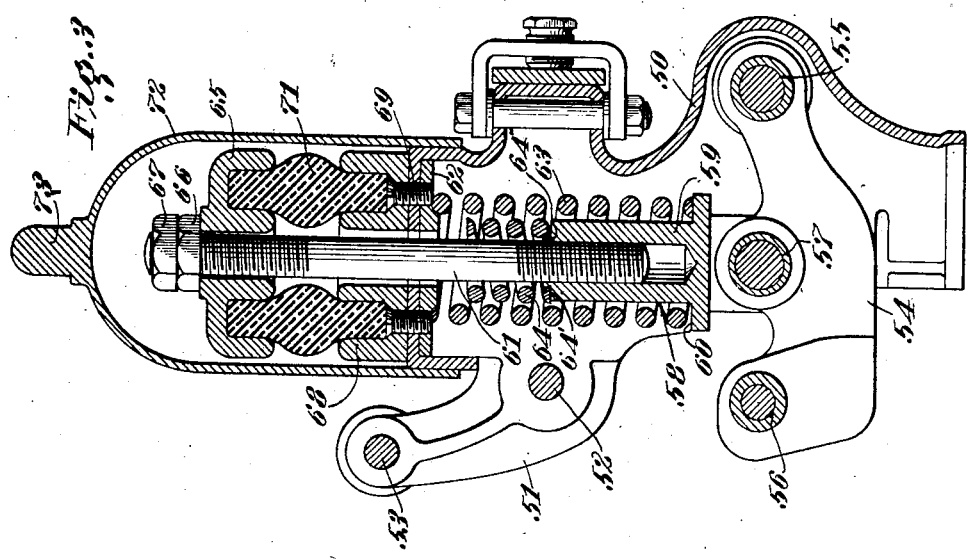
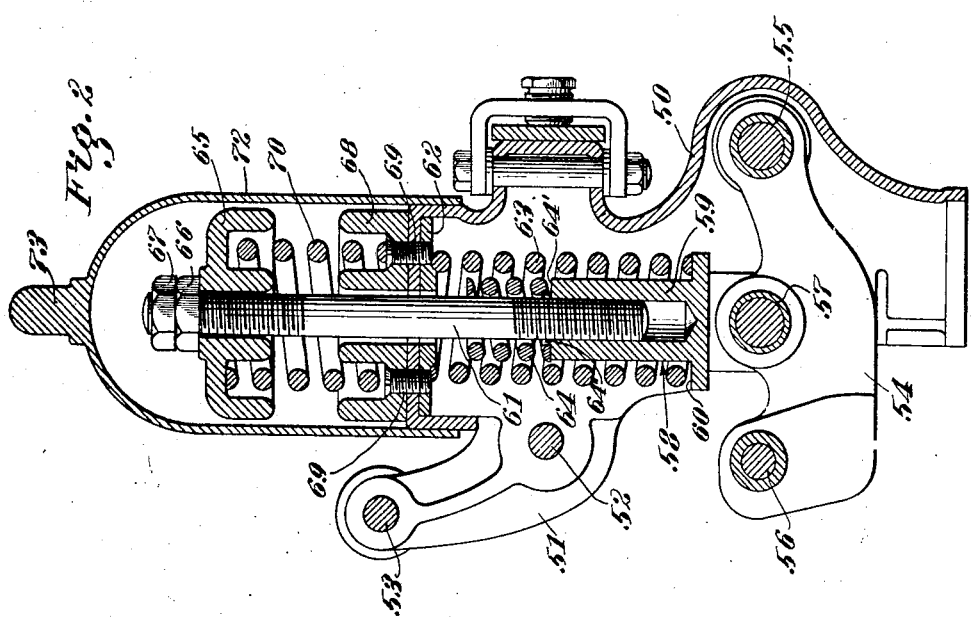
Inventor
John A. Stevens
by Roberts, Cushman & Woodberry.
Att'ys.

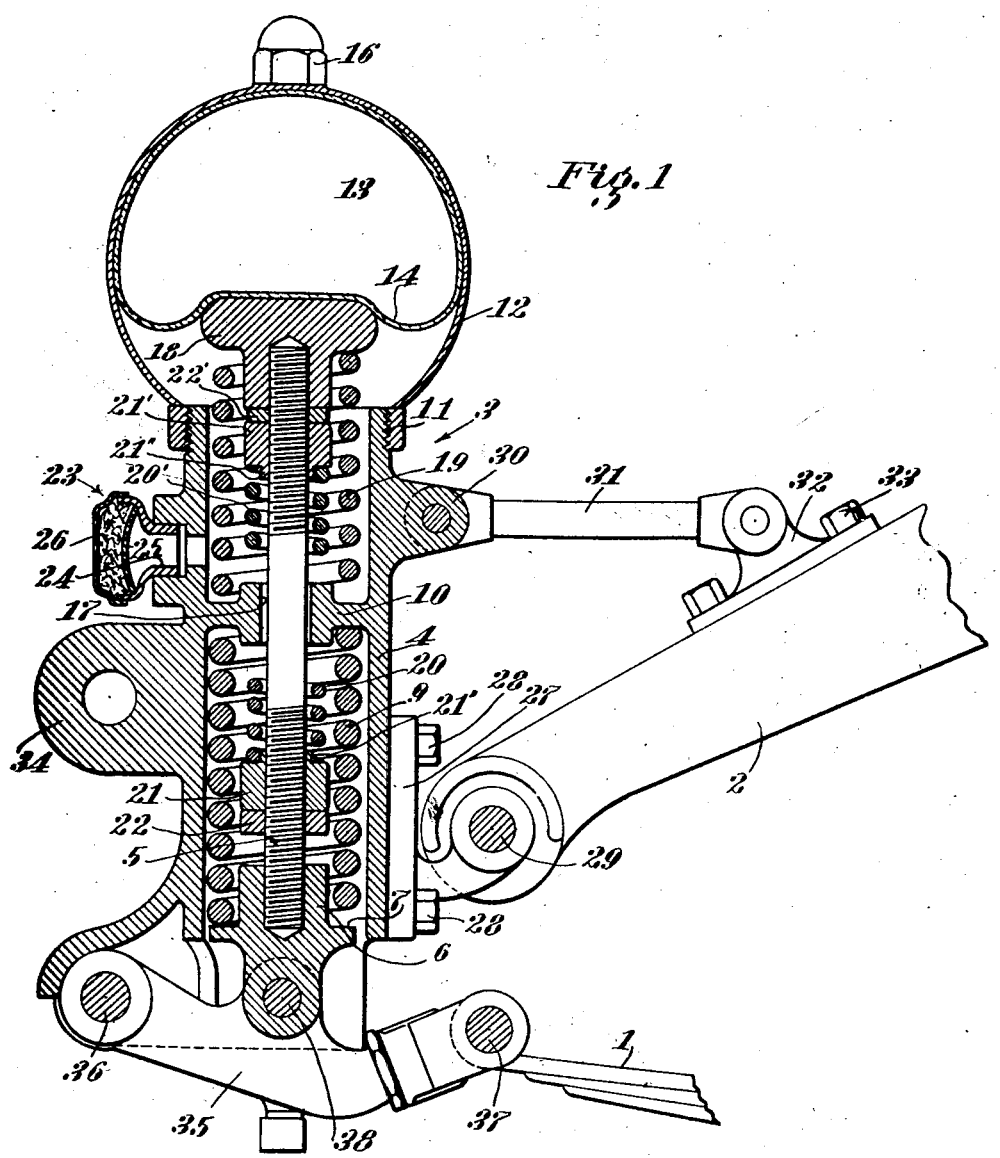

Patented Jan. 3, 1928.

1,655,205

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed September 9, 1926. Serial No. 134,403.

This invention relates to devices for absorbing shocks caused by the quick relative movement of two members. As one of the most common uses of such devices is in connection with automobiles to absorb the shocks caused by the unevenness of the road by the insertion of the device between the chassis and springs, an embodiment of the invention usable for this purpose is specifically set forth in the following description, but it is to be understood that this is not intended to be in any manner limiting on the scope of the invention.

At the present time automobiles and other motor vehicles are constructed to absorb the lighter shocks so that the occupants thereof are only subjected to shocks of greatest intensity, and those are softened so that a rolling or oscillatory motion is all that is transmitted to them; however, when going at high speeds or over rough roads, and in any case when travelling long distances, even this becomes disagreeable. It is one of the objects of this invention to overcome this disagreeable motion first, by cushioning the initial shock, and second, by slowing up or dampening the rebound. This second action is especially important in the case of automobiles equipped with balloon tires which themselves act as shock absorbers, but do not stop the objectionable oscillatory motion above described. Other objects and advantages of the invention will be apparent as the description proceeds and will be particularly pointed out in the appended claims.

Referring to the drawings in which are shown several embodiments of the invention:

Fig. 1 is a view substantially in vertical section of the device;

Fig. 2 is a substantially similar view of a modification of the device; and

Fig. 3 is a similar view of a further modification.

Referring to the embodiment of the devices shown in Fig. 1, the numeral 1 designates the usual semi-elliptic leaf spring mounted on the axle of a vehicle and adapted to support the usual chassis or frame 2. In accordance with this invention a shock absorbing device, designated as a whole by the numeral 3 is inserted between one end of the leaf spring 1 and the body or frame 2. The shock absorber 3 comprises a body portion 4 adapted to enclose a piston rod 5 screw threaded on either end. A sleeve 6 having interior threads engaging the lower threaded end of the rod 5 has on its exterior surface a shoulder 7 forming a seat for the coil spring 9 surrounding the piston rod 5 and mounted between said shoulder and an annular inturned abutment 10 which may be made integral with the body portion 4. Surrounding the upper end of the body portion 4 and suitably attached thereto as, for example, by screw threads 11 is a substantially spherical casing or dome 12 having a chamber 13 therein.

Enclosed within the casing 12 is an inner casing or carcass of rubberized fabric or other flexible material containing an inner lining of rubber or other suitable material both of which are here indicated diagrammatically at 14. The casing 14 is adapted to be inflated through a suitable valve 16 attached to the casing and extending through the top of the cylinder 12, the valve 16 being of any kind commonly employed in connection with pneumatic casings. The upper end of the piston rod 5 extends through an opening 17 in the abutment 10 and into the dome 12 and carries a support or head 18 thereon which may be attached thereto in any suitable manner, as for example, by ordinary screw threads. As the piston rod 5 is threaded into both the sleeve 6 and the head 18, it is obvious that by properly screwing the parts together the tension of springs 9 and 19 may be varied.

The support 18 bears against the lower side of the casing 14 and, as is obvious, will further compress the fluid in the compression chamber 13 on upward movement. A coil spring 19 which may be of smaller gauge wire than spring 9 is arranged between the abutment 10 and the lower side of the support 18 encircling the piston rod. This spring provides a variable resilient resistance against downward movement of the support or head 18.

A combined buffer and check spring supporting device is provided on the piston rod 5 on one side of the abutment 10. This device may comprise a nut 21 threaded on the piston rod and locked in any desired position by the check or lock nut 22. Supported on nut 21 is a relatively short but heavy spring 20 which normally terminates short of the abutment 10, and has the function of providing a resilient stop to the inward movement of the piston rod. This check spring is especially useful in the application of the device to automobiles between the chassis and springs when a very heavy load is to be supported or when an extremely heavy shock is sustained by the vehicle, and is also useful in the event of failure of either the pneumatic casing 14 or the spring 9.

A somewhat similar buffer or resilient stop is provided on the other side of the abutment 10, which in this case comprises a nut 21', which may be suitably spaced from the head 18 by a washer 22' or other spacing device and which is provided on its lower portion with a short spring 20' similar to spring 20. The springs 20 and 20' may be retained against nuts 21 and 21' respectively by means of flaring extensions 21" on each of the nuts engaging the endmost turn of the spring. The spring 20' has a function somewhat analogous to spring 20 in that it is designed to cushion the rebound from extremely heavy shocks only, thus acting in tandem with spring 19. It will be seen that both springs 20 and 20' are normally not in operation but are effective only to cushion extremely heavy shocks and rebounds respectively.

The casing is provided above the abutment 10 with a suitable breather 23 which may be constructed with an expanding nipple 24 threaded or otherwise secured in a suitable aperture in the side of casing 4 and provided on its inside with a screen 25. A perforated cover 26 may be secured in any desired manner to the nipple 24 and confine between it and the screen 25 any suitable packing material as, for example, wool. This breather may serve also as a drain for any liquid which might collect within the casing.

The casing 4 is rigidly held to the chassis 2 in any suitable manner as, for example, by a plate 27 which may be attached to the casing 4 by bolts 28 and pivoted to the end of the chassis 2 as shown at 29. The casing 4 is provided above the point of attachment of the plate 27 with a suitable bifurcated lug 30 which is attached by means of an arm 31 to a substitute clamp or connecting member 32 bolted or riveted as shown at 33 to the chassis 2. The casing 4 is also provided with a strut or bumper connection 34.

A lever 35 is pivoted adjacent to the bottom of casing 4 as at 36 and is pivoted at its other end to the springs 1 as shown at 37. Intermediate its ends the lever 35 is pivotally connected as shown at 38 to the sleeve 6 which is attached to the lower end of the rod 5. Hence it will be seen that as only one end of the rod 5 is positively connected to a mechanical element either stationary or moving in a predetermined path, it is substantially unguided. This results in minimizing friction as there are few places where one part has a rubbing or sliding contact with another part and consequently the device will wear indefinitely.

The operation of the device is as follows: When the wheels of the vehicle hit an unevent point in the road, the first action is that pivotal points 29 and 37, of the chassis and springs respectively, approach each other thereby rocking the lever 35 in a counterclockwise direction, forcing the rod 5 upwardly. This movement compresses the spring 9 and simultaneously causes the head 18 to engage the casing 14, whereby the air or other fluid in the chamber 13 is compressed thus cushioning and absorbing the shock. On the rebound, the downward movement of the rod 5 is slowed up by compression of the spring 19, thus effectively tending to neutralize and reduce the oscillatory tendency otherwise present.

Referring to Figs. 2 and 3 the device consists of a casing 50 having an integral arm 51 thereon which is adapted to be connected to the chassis of an automobile at points 52 and 53 in somewhat the same manner as the device shown in Fig. 1 is adapted to be connected to the chassis 2 as shown at points 29 and 30. A rocker arm 54 is pivoted to the casing 50 at 55 and is adapted to have a point 56 thereon connected to the usual springs of the vehicle. An intermediate point 57 of the rocker arm carries a piston generally indicated at 58 comprising a sleeve member 59 having a shoulder 60 at its lower portion and being internally threaded for engagement with a piston rod 61. The casing 50 is provided with an inwardly directed abutment or flange 62, and between this flange and the shoulder 60 is provided a spring 63 which operates in the same manner as spring 9 in the embodiment described above. A short but heavy spring 64 is supported upon a shoulder 64' on the upper end of sleeve 59 and may be held in position by an upwardly flaring extension 64" of said sleeve engaging the endmost turn of the spring. Spring 64 normally terminates short of the abutment 62, whereby this spring is normally out of operation; but it becomes effective on an extremely heavy shock or in the event an extremely heavy load is placed upon the device, to act in tandem with spring 63 in opposing movement of the piston in an upward direction.

The rod 61 is provided at its upper end with a collar 65 which is held in any predetermined adjusted position by a pair of nuts 66 and 67. A somewhat similar collar 68 is fastened to the abutment 62 by a plurality of screws 69. Collars 65 and 68 are each provided with an annular groove of substantially the same width and diameter and facing each other. In the embodiment of the device shown in Fig. 2 a spring 70 is placed in the grooves of members 65 and 68 and tends to hold these collars apart thereby opposing movement of the rod 61 in a downward direction, the recoil from the initial shock being taken up thereby. In the embodiment illustrated in Fig. 3 an annular member 71 of resilient material, such as rubber, may be inserted in the grooves of members 65 and 68 in place of the spring 70 shown in Fig. 2. This member under normal compression is deformed in the manner shown in Fig. 3 so that it is bulged both outwardly and inwardly in the space between the collars. Its function is, however, exactly the same as that explained in relation to Fig. 2. Nuts 66 and 67 may be adjusted to any desired position along the rod 61 thus varying the effective resistance of the spring 70 or the resilient rubber member 71 in a manner similar to that in which the load on spring 19 (Fig. 1) may be varied and for the same purpose, that is, to vary the resistance of the device to shocks in recoil from the initial shocks.

A dome 72 is ordinarily used in connection with the device to prevent dust and other foreign material from becoming lodged therein, the dome being held in position in any suitable manner not shown in detail on the drawings and being provided with an extension 73 at its top, which may serve both as an ornament and as a means to permit gripping the dome in the event that the dome is screw threaded onto the body 50 of the device.

I do not wish to be limited to the shape, size or construction of the embodiments of the invention here shown, but merely by the scope of the appended claims.

I claim:

1. A device for absorbing the shocks caused by the quick relative movement of two members, comprising a casing fixed to one of said members, a lever pivoted to the other of said members and to a part of said casing, cushioning means having a rod pivoted to said lever and adapted to oscillate within said casing, an abutment within said casing adjacent to the rod, shoulders on the rod spaced from said abutment, springs surrounding said rod on either side of said abutment between it and said shoulders to absorb both the initial shock and the recoil, and an additional spring fixed to one of said shoulders and normally terminating short of said abutment, whereby said additional spring is effective to absorb only an extremely heavy shock.

2. A device for absorbing the shocks caused by the quick relative movement of two members comprising a casing fixed to one of said members, a lever pivoted to the other of said members and to a part of said casing, cushioning means having a rod pivoted to said lever and adapted to oscillate within said casing, an abutment within said casing adjacent to the rod, shoulders on the rod spaced from said abutment, springs surrounding said rod on either side of said abutment between it and said shoulders to absorb both the initial shock and the recoil, and additional springs fixed to both of said shoulders and normally terminating short of said abutment, whereby said additional springs are effective only on an extremely heavy shock to cushion and absorb both the initial shock and the recoil.

3. A device for absorbing the shocks caused by the quick relative movement of two members comprising a compression member having a casing fixed to one of said members, said compression member containing a compressible fluid, a lever pivoted to the other of said members and to a part of said casing, a rod pivoted to said lever and operatively connected to said compression member, whereby movement of the rod in one direction will be opposed by increased pressure of the fluid in said compression member, an abutment adjacent to said rod, a shoulder on said rod, and a spring fixed to said shoulder having its end normally spaced from said abutment and effective only on an extremely heavy shock for cushioning and dampening movement of said rod in the opposite direction.

4. A device for absorbing the shocks caused by the quick relative movement of two members, comprising a compression member having a casing fixed to one of said members, said compression member containing a compressible fluid, a lever pivoted to the other of said members and to a part of said casing, a rod pivoted to said lever and adapted to oscillate in said casing, an abutment adjacent to the said rod, shoulders on said rod, a spring extending from one of said shoulders to said abutment and acting in tandem with said compression member to oppose movement of said rod in one direction, an additional spring fixed to each of said shoulders and normally terminating short of said abutment, the additional springs being effective only for an extremely heavy shock to oppose extreme movement of said rod in either direction.

5. A device for absorbing the shocks caused by the quick relative movement of two members, comprising a compression member having a casing fixed to one of said members, said member containing a compressible fluid, a lever pivoted to the other of said members and to a part of said casing, a rod pivoted to said lever and adapted to oscillate in said casing, an abutment adjacent to said rod, shoulders on said rod, a spring extending from one of said shoulders to said abutment to act in tandem with said compression member in opposing movement of said rod in one direction, a second spring extending from the other shoulder to the abutment opposing movement of said rod in the opposite direction, and an additional spring fixed to said other shoulder and normally terminating short of said abutment, said additional spring being effective only in an extremely heavy shock and then acting in tandem with said second spring.

6. A device for absorbing the shocks caused by the quick relative movement of two members, comprising a compression member having a casing fixed to one of said members, said member containing a compressible fluid, a lever pivoted to the other of said members and to a part of said casing, a rod pivoted to said lever and adapted to oscillate in said chamber, an abutment adjacent to the said rod, shoulders on said rod, a spring extending from one of said shoulders to said compression member to act in tandem with said compression member in opposing movement of said rod in one direction, a second spring extending from the other shoulder to the abutment opposing movement of said rod in the opposite direction, an additional spring fixed to each of said shoulders and normally terminating short of said abutment, the additional springs being effective only on an extremely heavy shock to oppose extreme movement of said rod in either direction.

7. A device for absorbing the shocks caused by the quick relative movement of two members comprising a casing fixed to one of said members, a compression member within said casing, said compression member containing a compressible fluid, a lever pivoted to the other of said members and to a part of said casing, a rod pivoted to said lever and adapted to oscillate within said casing, whereby movement of the rod in one direction will be opposed by increased pressure of the fluid in said compression member, an abutment adjacent to the said rod, a shoulder on said rod, a spring extending between said shoulder and said abutment, and a second spring fixed to said shoulder having its end normally spaced from said abutment and effective only on an extremely heavy shock when both said springs act in tandem to oppose movement of the rod in the opposite direction.

Signed by me at Lowell, Massachusetts this 30th day of August, 1926.

JOHN A. STEVENS.